US012704228B2

(12) United States Patent
Nykerk

(10) Patent No.: US 12,704,228 B2
(45) Date of Patent: Aug. 11, 2026

(54) VARIABLE LIGHT PIPE ILLUMINATION WIDTH LEVELS

(71) Applicant: Flex-N-Gate Advanced Product Development, LLC, Windsor (CA)

(72) Inventor: Todd Nykerk, Holland, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 19/043,942

(22) Filed: Feb. 3, 2025

(65) Prior Publication Data

US 2025/0257853 A1 Aug. 14, 2025

Related U.S. Application Data

(60) Provisional application No. 63/551,332, filed on Feb. 8, 2024.

(51) Int. Cl.

| | |
|---|---|
| ***F21K 9/69*** | (2016.01) |
| ***F21K 9/61*** | (2016.01) |
| ***F21K 9/66*** | (2016.01) |
| *F21Y 103/10* | (2016.01) |
| *F21Y 115/10* | (2016.01) |

(52) U.S. Cl.

CPC .................. *F21K 9/69* (2016.08); *F21K 9/61* (2016.08); *F21K 9/66* (2016.08); *F21Y 2103/10* (2016.08); *F21Y 2115/10* (2016.08)

(58) Field of Classification Search

CPC ..... F21K 9/69; F21K 9/61; F21K 9/66; F21Y 2103/10; F21Y 2115/10; G02B 6/0051; G02B 6/005; G02B 6/0076

See application file for complete search history.

(56) References Cited

U.S. PATENT DOCUMENTS

| | | | | |
|---|---|---|---|---|
| 7,086,765 | B2 | 8/2006 | Wehner | |
| 7,341,365 | B2 | 3/2008 | Basile et al. | |
| 7,400,439 | B2 | 7/2008 | Holman | |
| 7,446,938 | B2 | 11/2008 | Miyatake et al. | |
| 7,513,669 | B2 * | 4/2009 | Chua ...................... | B82Y 20/00 362/627 |
| 8,687,149 | B2 | 4/2014 | Bell et al. | |
| 9,448,353 | B2 | 9/2016 | Holman et al. | |

(Continued)

OTHER PUBLICATIONS

Extended European Search Report issued Jun. 26, 2025 in corresponding EP Application No. 25156538.8, 9 pages.

*Primary Examiner* — Evan P Dzierzynski
(74) *Attorney, Agent, or Firm* — Avek IP, LLC

(57) ABSTRACT

A lit light pipe apparatus comprises several elements: at least two light sources, at least two clear diffusion sheets, a mask, and a light pipe. An edge of each of the clear diffusion sheets is aligned with one of the arrays of light sources to provide independent edge lighting of each diffusion sheet. Each clear diffusion sheet emits a homogeneous light through its façade. The mask is aligned with the façades of the clear diffusion sheets and positioned between the sheets and the light pipe. The mask features a clear slot area through which the altered light shines when illuminated. A light source associated with a specific clear diffusion sheet may be activated while the remaining light sources are deactivated. An apparent width of the resultant light pipe illumination will vary depending on the distance from the specific clear diffusion sheet and the mask.

10 Claims, 7 Drawing Sheets

(56) References Cited

U.S. PATENT DOCUMENTS

| | | | | |
|---|---|---|---|---|
| 9,772,085 | B2 | 9/2017 | Dubosc | |
| 9,884,992 | B2 | 2/2018 | Choi et al. | |
| 10,443,790 | B2 | 10/2019 | George et al. | |
| 11,506,359 | B2 | 11/2022 | Nykerk | |
| 2012/0032997 | A1 | 2/2012 | Cha et al. | |
| 2012/0235891 | A1 | 9/2012 | Nishitani et al. | |
| 2017/0068039 | A1* | 3/2017 | Bohn | G02B 6/0073 |
| 2017/0343166 | A1* | 11/2017 | George | F21K 9/61 |
| 2022/0035088 | A1* | 2/2022 | Fattal | G02B 6/0036 |
| 2022/0235913 | A1* | 7/2022 | Lee | F21S 43/31 |

* cited by examiner

VARIABLE LIGHT PIPE ILLUMINATION WIDTH LEVELS

CROSS-REFERENCE TO RELATED APPLICATIONS

This application claims the benefit of priority of U.S. Provisional Patent Application No. 63/551,332, entitled Variable Light Pipe Illumination Width Levels and filed on Feb. 8, 2024, the disclosure of which is herein incorporated by reference in its entirety.

BACKGROUND OF THE INVENTION

1. Field

The disclosed embodiments relate generally to the field of light assemblies. More specifically, the disclosed embodiments relate to providing light pipe illumination with varying widths.

2. Description of the Related Art

Many different types of lighting assemblies having a light pipe have been described in the prior art. For example, U.S. Pat. No. 11,506,359 to Nykerk describes lamp assemblies with illuminated light pipes. U.S. Pat. No. 10,443,790 to George et al. discloses a light pipe assembly with a LED light source at one end. The pipe has a surface with an emitting portion and an overlay portion, along with a reflective secondary surface. U.S. Pat. No. 9,772,085 to Dubosc discloses an optical light emission system for vehicles comprised of two lighting subsystems with a light guide for mixing and homogenizing the two light sources. U.S. Pat. No. 7,341,365 to Basile et al. discloses an LED unit for a vehicle lamp assembly having a housing, LEDs, a light pipe, and an optic structure. The optic structure is used to scatter light in a series of directions distal to the housing. U.S. Pat. No. 7,086,765 to Wehner discloses an LED lamp assembly with an array of LEDs that emit light onto a reflector, and the reflector reflects the light into a light beam. A light pipe is positioned in front of the reflector and receives light from a separate LED at its end.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In certain embodiments, a light pipe apparatus, includes: at least two clear diffusion sheets aligned adjacent each other, wherein each clear diffusion sheet includes an edge and a façade; at least two light sources, where each light source is configured to illuminate a respective one of the at least two clear diffusion sheets via the edge such that light is emitted from the façade; a mask disposed adjacent a first sheet of the at least two clear diffusion sheets, wherein the mask includes a slot aligned with a façade of the first sheet such that lighted emitted from the façade passes through the slot; and a light pipe aligned with the slot such that light passing through the slot illuminates at least a portion of the light pipe.

In certain embodiments, each of the at least two light sources includes an array of light emitting devices.

In certain embodiments, each array of light emitting devices is aligned with the edge of a corresponding clear diffusion sheet to provide edge lighting of the corresponding clear diffusion sheet.

In certain embodiments, at least two clear diffusion sheets are disposed different distances from the mask such that a width of light projected through the slot depends on a distance between the mask and a respective clear diffusion sheet.

In certain embodiments, individual illumination of each of the at least two light sources enables alteration of the width of light projected through the slot thereby altering the portion of the light pipe that is illuminated.

In certain embodiments, the slot includes a longitudinal shape configured to substantially align with the light pipe.

In certain embodiments, the longitudinal shape of the slot includes an opening through the mask that substantially spans a length of the at least two clear diffusion sheets and the light pipe.

In certain embodiments, a method of projecting light from a light pipe apparatus includes: emitting light from at least two light sources, where each light source is configured to illuminate a respective one of at least two clear diffusion sheets via an edge of each clear diffusion sheet such that light is emitted from a façade of each clear diffusion sheet; filtering light emitted from the at least two clear diffusion sheets via a mask disposed adjacent a first sheet of the at least two clear diffusion sheets, wherein the mask includes a slot aligned with a façade of the first sheet such that lighted emitted from the façade passes through the slot; and projecting light from a light pipe aligned with the slot such that light passing through the slot illuminates at least a portion of the light pipe.

In certain embodiments, emitting light from each of the at least two light sources includes emitting light from an array of light emitting devices.

In certain embodiments, the method includes individually emitting light from each of the at least two light sources, wherein the at least two clear diffusion sheets are disposed different distances from the mask such that an angle of light passing through the slot depends on a distance between the mask and a respective diffusion sheet.

In certain embodiments, the method includes altering a width of the portion of the light pipe being illuminated by edge lighting of each of the at least two clear diffusion sheets individually, wherein the at least two clear diffusion sheets are disposed different distances from the mask.

In certain embodiments, filtering light via the mask includes filtering light in a longitudinal shape via the slot such that the filtered light substantially aligns with the light pipe.

In certain embodiments, projecting light from the light pipe includes projecting light having a longitudinal shape that substantially spans a length of the light pipe.

In certain embodiments, the method includes illuminating a full width of the light pipe by activating one of the light sources associated with the clear diffusion sheet nearest the mask.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
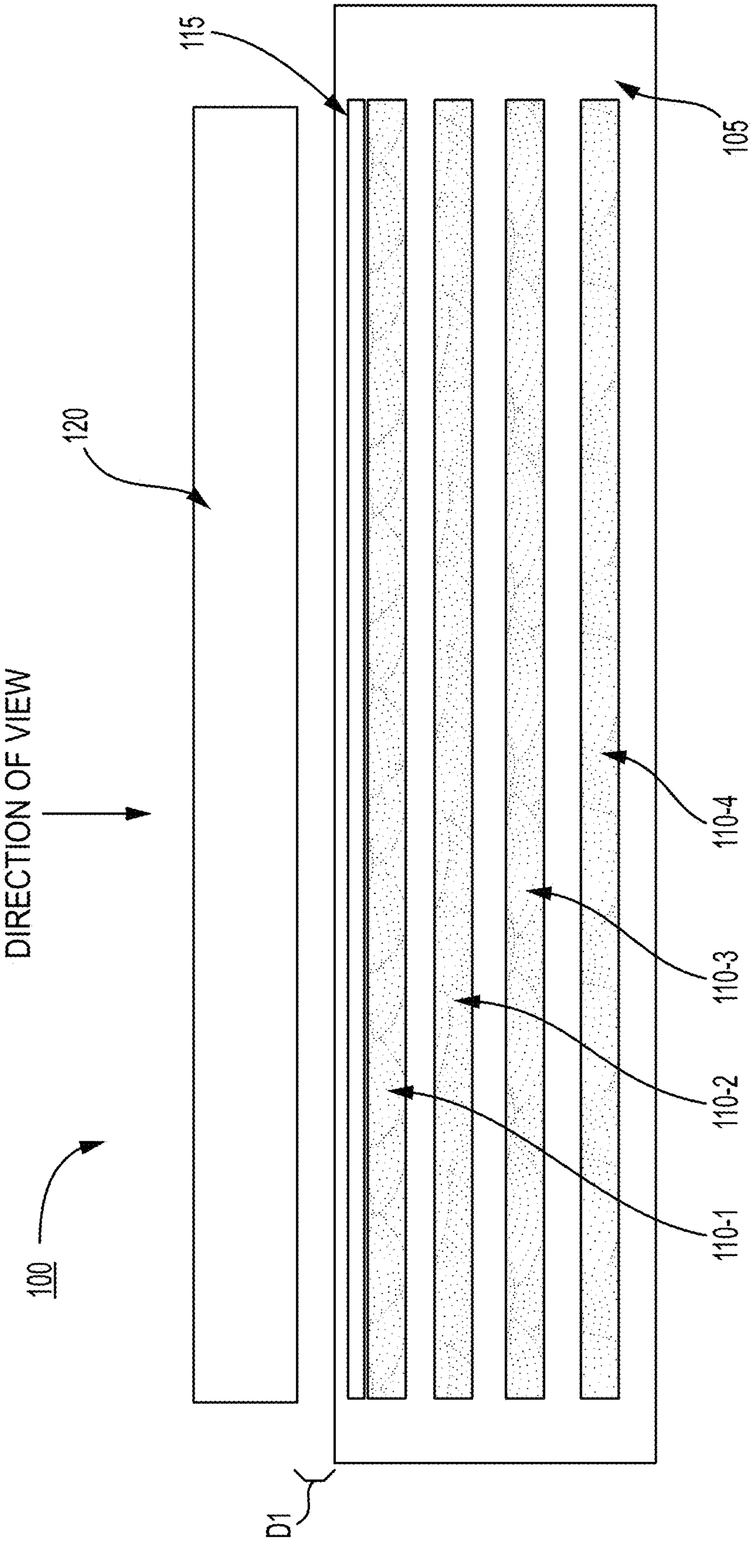
FIG. 1 shows a schematic of a light assembly according to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

It must be noted that as used herein and, in the claims, the singular forms "a," "an" and "the" include plural referents unless the context clearly dictates otherwise. Thus, for example, reference to "a layer" includes two or more layers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" or "approximately" is used, the stated quantity can vary by up to 10%.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

As used herein, the terms "first," "second," and other ordinals will be understood to provide differentiation only, rather than imposing any specific spatial or temporal order.

As used herein, the term "substantially" generally refers to ±5% of a stated value.

This disclosure describes a lit light pipe apparatus which comprises several elements: at least two light sources, at least two clear diffusion sheets, a mask, and a light pipe. An edge of each of the clear diffusion sheets is aligned with one of the light sources. Each clear diffusion sheet emits a homogeneous light through the façade of the sheet. The light sources typically consist of an LED array. The mask is aligned with the façades of the clear diffusion sheets and positioned between the clear diffusion sheets and the light pipe. The mask, a flat, opaque sheet features a clear slot area through which the altered light shines when illuminated. A light source associated with a specific clear diffusion sheet may be activated while the remaining light sources are deactivated. An apparent width of the resultant light pipe illumination will be altered depending on the distance from the specific clear diffusion sheet and the mask.

FIG. 1 shows a side view of an exemplary lit light pipe apparatus 100. Lit light pipe apparatus 100 comprises a light source 105. The light source 105 is typically a printed circuit board (PCB) upon which are mounted a number of light emitting elements (see FIG. 2). The light emitting elements are typically light emitting diodes (LED). Light emitting elements other than LEDs may be used and still fall within the scope of the claimed subject matter. Examples of the light emitting elements are discussed in U.S. Pat. No. 11,506,359, issued to the present Assignee and is herein incorporated by reference for all purposes. The light emitting elements may be arranged in a linear array.

Lit light pipe apparatus 100 comprises at least two clear diffusion sheets 110-1, 110-2, 110-3, 110-4. The clear diffusion sheets may be colorless or may be colored to add interesting coloring effects to the lit light pipe apparatus 100. FIG. 1 illustrates a lit light pipe apparatus 100 comprising four clear diffusion sheets. For clarity, clear diffusion sheet 110-1 will have the designation a "first", clear diffusion sheet 110-2 will have the designation a "second", and so on. Those having skill in the art will understand that any number of clear diffusion sheets greater than two may be used and still fall within the scope of the claimed subject matter. A thickness of the clear diffusion sheets may range from about 0.05 inches to about 0.75 inches. In some embodiments, the thickness of the clear diffusion sheets is about 0.125 inches. The four clear diffusion sheets illustrated in FIG. 1 are shown "edge-on". That is, an edge of each sheet is projected out of the plane of the page.

Figure 7:
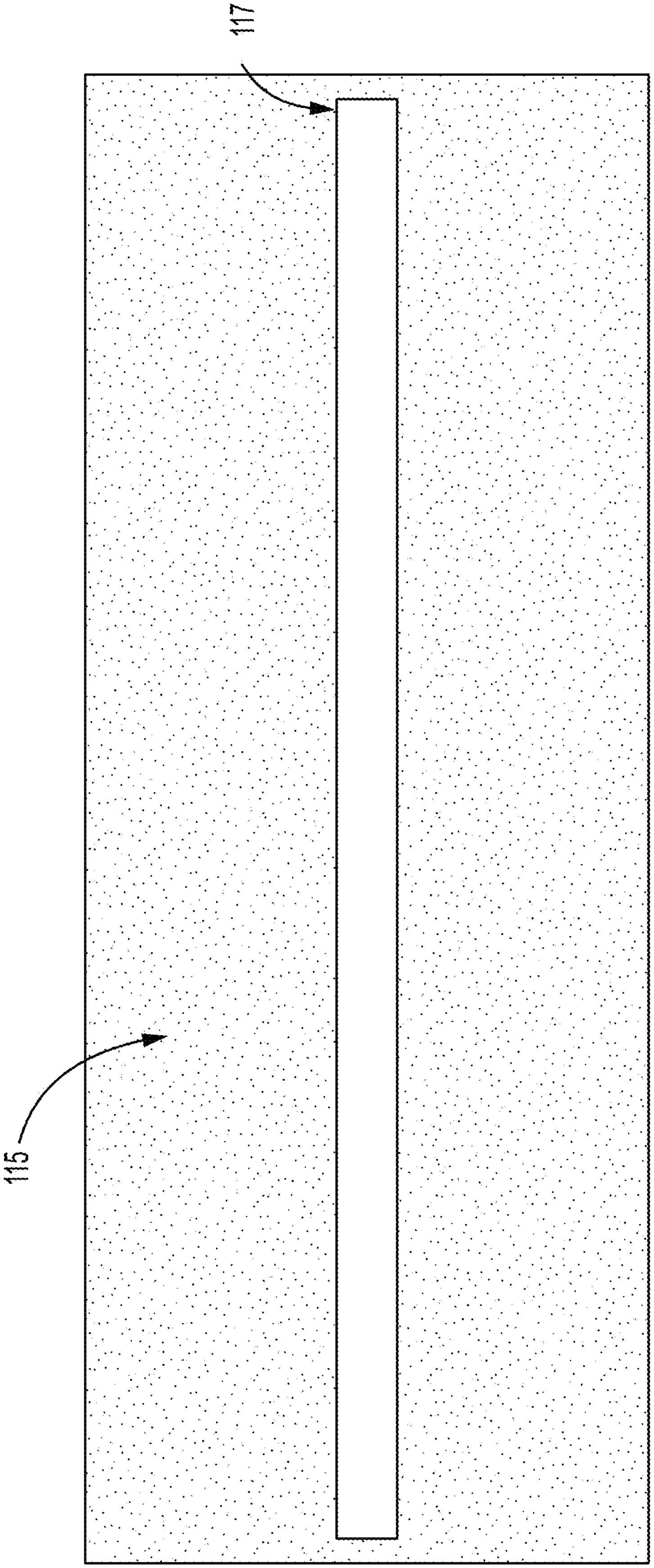
FIG. 7 shows a top view of a mask having a slot, in an embodiment.

Lit light pipe apparatus 100 comprises a mask 115 aligned with a façade of the first clear diffusion sheet 110-1 and situated between first clear diffusion sheet 110-1 and a light pipe 120. Mask 115 is formed from an opaque or semi-opaque (e.g., partially translucent) material and has a slot that runs the entire length of the clear diffusion sheets and the light pipe 120. FIG. 7 shows mask 115 with a slot 117, in an embodiment. Slot 117 may be an opening or a clear (i.e., substantially transparent) portion. Slot 117 may have a width from about 1 mm and 10 mm. In some embodiments, slot 117 has a rectangular shape. However, slot 117 may have other general shapes such as oval, circular, an arc, etc. A gap exists between mask 115 and light pipe 120 having a distance D1. Light pipe 120 is for example an elongated optical member, such as cylindrical rods made of an optically clear plastic, e.g., polycarbonate (PC) or poly(methyl methacrylate) (PMMA). A cross sectional shape of light pipe 120 may be cylindrical or oval. Light coming from the lit light pipe will have an apparent width and can be reduced. The size reduction depends upon the size of the light pipe 120, the distance D1 between light pipe 120 and the mask 115, and the width of slot 117 in mask 115. In other words, an angle of light shining through slot 117 depends on these various factors. The lit light pipe apparatus 100 is viewed from the top of the page as indicated in FIG. 1.

Figure 2:
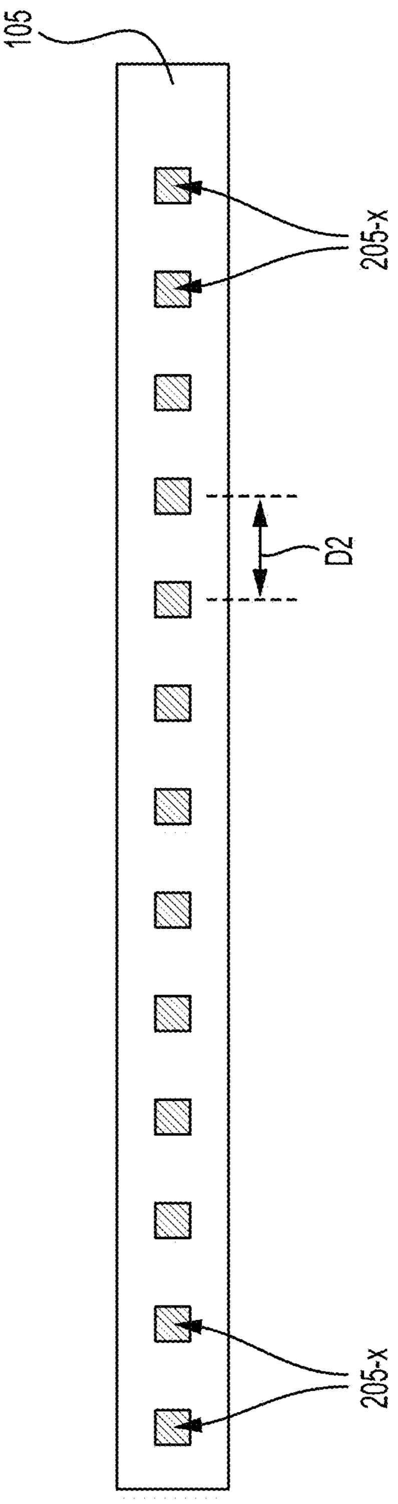
FIG. 2 shows a schematic of an array of light sources according to some embodiments.

FIG. 2 is a top-down view of the light source 105 PCB having the plurality of light emitting elements 205-*x* mounted thereto in a single linear array. Not all light emitting elements are labeled in FIG. 2 for clarity of illustration. The plurality of light emitting elements 205-*x* are configured to provide an array of light emitting elements (e.g., a linear array of LEDs) aligned along a longitudinal direction and arranged in a linear pattern. Each array may have light emitting elements of the same color or the color along the array may change. In embodiments, light source 105 is configured with a linear array of LEDs aligned with a longitudinal edge of a corresponding diffusion sheet 110-*x*; for example, in the FIG. 1 embodiment, light sources 105 comprises four linear arrays of LEDs 205-*x* with each array corresponding to one of the diffusion sheets 110-1, 110-2, 110-3, 110-4. All the arrays of light emitting elements may have a single color or the color may change among the various arrays. Returning to FIG. 2, the plurality of light emitting elements 205-*x* are mounted on the PCB and spaced a predetermined distance apart from one another, such as the distance labeled "D2" in FIG. 2. In some embodiments, the plurality of light emitting elements 205-*x* are arranged equidistant from one another on PCB 105 (i.e., each of the light emitting elements is a distance D2 apart from one another). As best viewed in FIG. 3, each of the clear diffusion sheets 110-*x* is configured to be edge-lit (i.e., illuminated via light entering the diffusion sheet along its edge) via an array of light emitting elements aligned along the longitudinal edge (i.e., the bottom edge as viewed in FIGS. 1 and 3).

Figure 3:
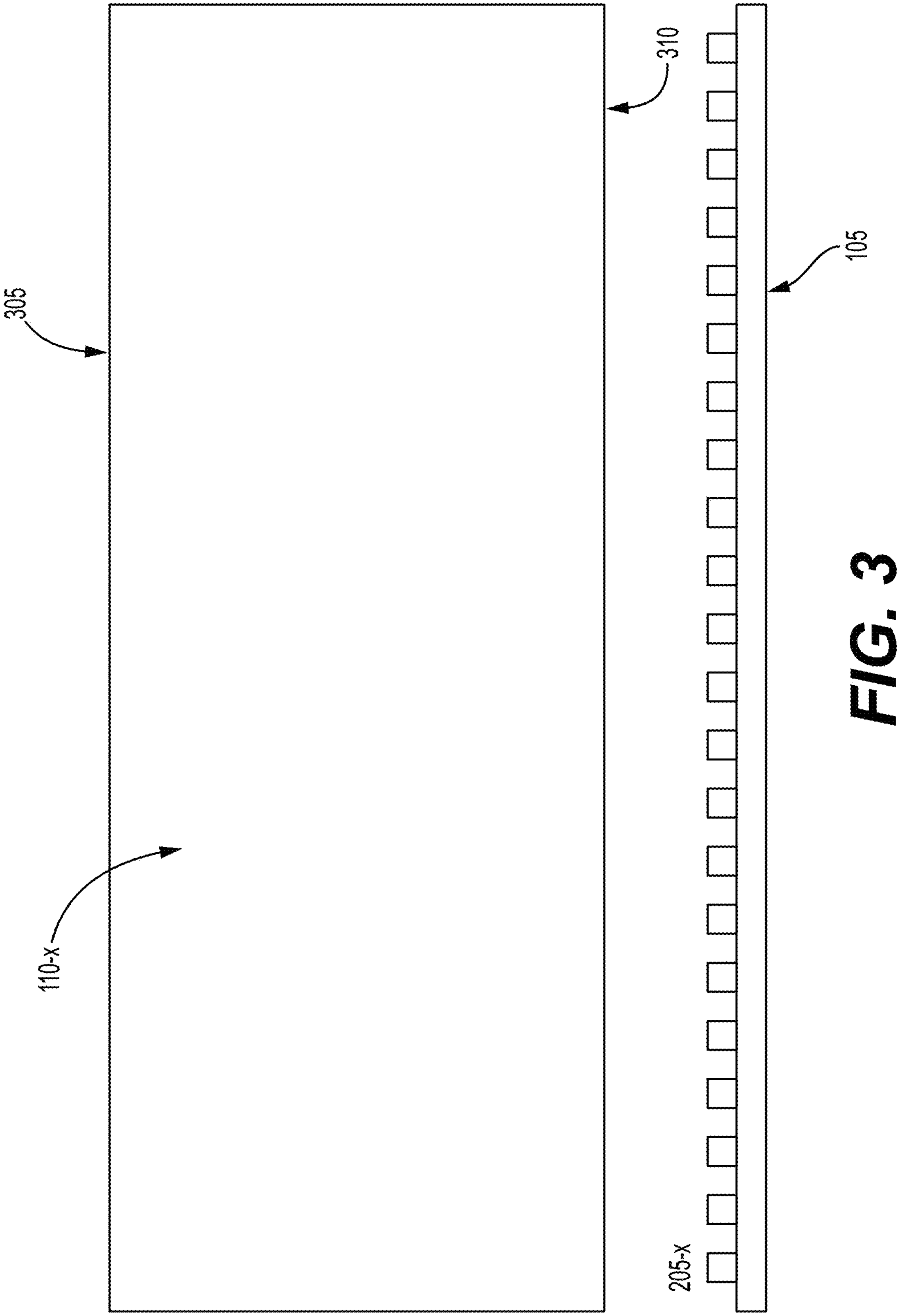
FIG. 3 shows a schematic of an array of light sources according to some embodiments.

FIG. 3 is a side view of light source 105 having the plurality of light emitting elements 205-*x* mounted thereto in a single linear array and one of the clear diffusion sheets 110-*x* positioned above the array of light emitting elements. Not all light emitting elements are labeled in FIG. 3 for clarity of illustration. The clear diffusion sheet 110-*x* has a "top" edge 305 and a "bottom" edge 310. Light emitted from the plurality of light emitting elements 205-*x* enters the bottom edge 310 of clear diffusion sheet 110-*x* and homogeneous light is emitted from the clear diffusion sheet through a façade of the clear diffusion sheet that is in the plane of the page. That is, homogeneous light is emitted in directions out of the page from the perspective of FIG. 3.

The operation of lit light pipe apparatus 100 involves activating one of the arrays of light emitting elements 205-*x*. Light from the array enters the bottom edge 310 of the corresponding clear diffusion sheet 110-*x* and homogeneous light is emitted from the clear diffusion sheet through a façade of the clear diffusion sheet. Light emitted from the façade of the sheet passes through slot 117 in the mask and illuminates the light pipe.

In a first example of the operation of lit light pipe apparatus 100 the activated array is the array associated with the first clear diffusion sheet 110-1 and the light illuminates slot 117. The convex shape of the light pipe's outer surface (e.g. facing the observer) defines a focal point for the light pipe. Properly selected parameters such as the focal point of the light pipe, the distance D1 between the light pipe and the mask, and the width of slot 117 allows the light emitted through slot 117 to spread with a sufficient angle to fill the diameter of the light pipe. From the perspective of the observer, this would correspond to a maximum width of the lit light pipe.

In a second example of the operation of lit light pipe apparatus 100 the activated array is the array associated with the second clear diffusion sheet 110-2, and the array associated with the first clear diffusion sheet 110-1 is deactivated. The light from the second array illuminates slot 117. The light that passes through slot 117 and illuminates the light pipe is reduced to a narrower angle because the distance between the second clear diffusion sheet 110-2 and the mask is increased compared to distance between the first diffusion sheet 110-1 and the mask. From the perspective of the observer, this would correspond to a reduction in the width of the lit light pipe when compared to the first example. This sequence can be repeated wherein the smallest width apparent to the observer is generated by activating the array associated with the clear diffusion sheet that is farthest from the mask and all other arrays are deactivated. Additionally, the distances between each of the diffusion sheets 110-*x* may be varied to further manipulate the apparent widths of the illuminated light pipe depending on which light array is activated.

Figure 4:
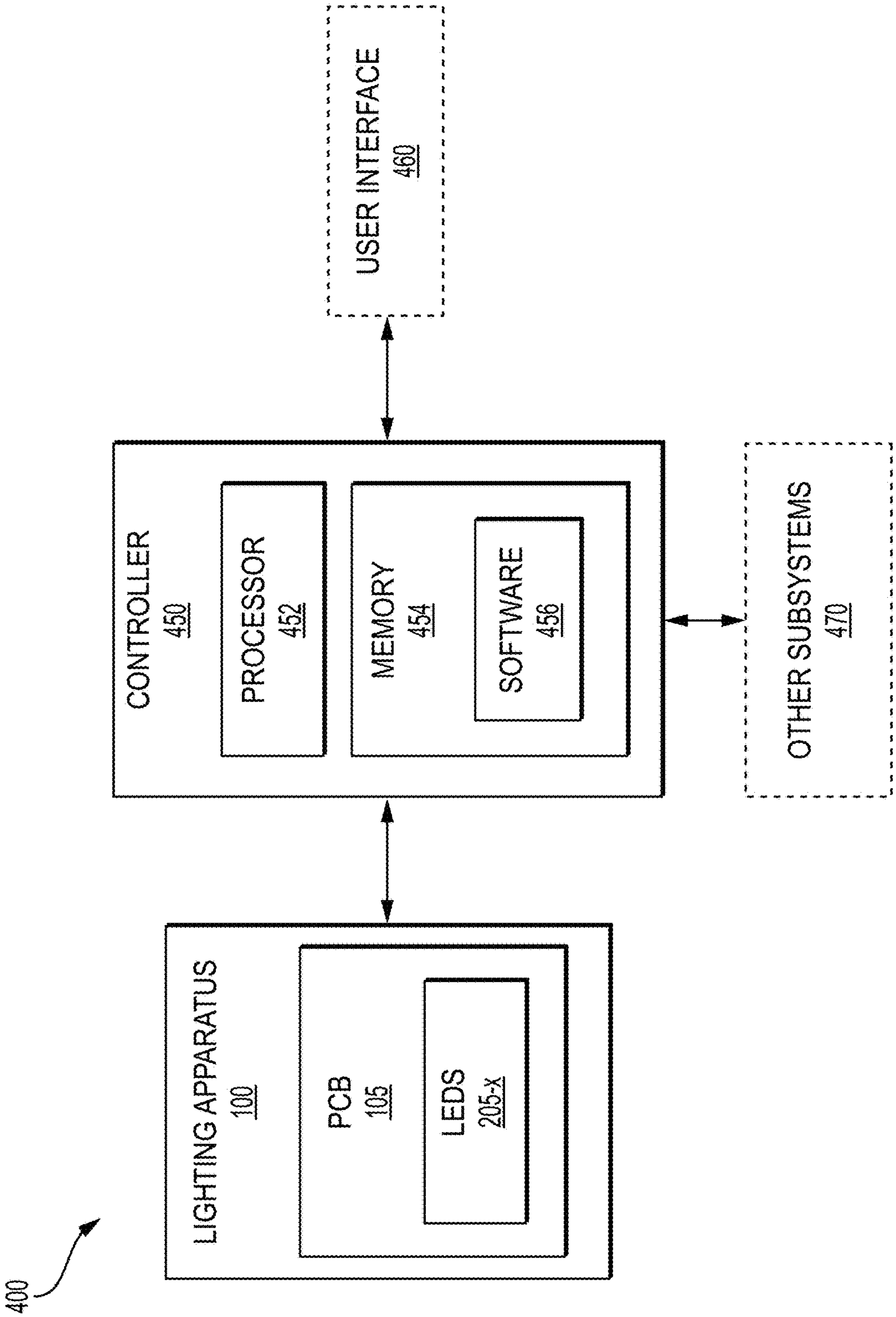
FIG. 4 shows a schematic of a light apparatus control scheme according to some embodiments.

FIG. 4 is a block diagram showing components of an exemplary control system 400 for controlling lit light pipe apparatus 100. Control system 400 includes a controller 450, which is for example a computer, microcontroller, microprocessor, or programmable logic controller (PLC) having a memory 454, including a non-transitory medium for storing software 456, and a processor 452 for executing instructions of software 456. An optional user interface 460 enables a user to transmit instructions and receive information, as further described below. The controller 450 is not limited by the materials from which it is formed or the processing mechanisms employed therein and, as such, may be implemented via semiconductor(s) and/or transistors (e.g., electronic integrated circuits (ICs)), and so forth.

In certain embodiments, user interface 460 includes a user input device, which may include one or more buttons or switches located in a vehicle cabin or on a handheld device (e.g., a key fob) for controlling the lit light pipe apparatus 100. In some embodiments, user interface 460 includes a touch screen display device configured for receiving touch indications by the user. The touch screen display device may be located in the vehicle cabin and/or accessed remotely via a mobile device (e.g., smartphone, tablet, or laptop computer). User interface 460 may be configured to present a menu for selecting various patterns via the plurality of light sources employed in lit light pipe apparatus 100.

Control system 400 of FIG. 4 enables lit light pipe apparatus 100 to provide custom appearances (e.g., stylistic features or lighting). In certain embodiments, controller 450 is optionally coupled communicatively with other subsystems 470. For example, controller 450 may be programmed with instructions for controlling the various light sources in coordination with other subsystems 470. This enables automatic control of the lit light pipe apparatus 100 based on input signals provided by other subsystems (e.g., associated with a vehicle being on or off, key FOB being present/absent, etc.).

Communication between user interface 460, controller 450, other subsystems 470, and the lit light pipe apparatus 100 may be by a wired and/or wireless communication media. For example, controller 450 may include a transmitter/receiver, a multi-channel input/output (I/O) data bus, or the like (not shown) for communicatively coupling with user interface 460 and PCB of light sources 105 of lit light pipe apparatus 100. The controller 450 is programmed with instructions for sending signals to the light source 105 PCB for switching light sources on/off or for dimming the light sources via for example pulse-width modulation (PWM). Other electronics known to those of skill in the art may be used in conjunction with the controller 450 for controlling light sources and providing PWM without departing from the scope hereof. The programmed instructions may be predetermined and/or responsive to inputs from the user interface 460 or other subsystems 470. For example, programmed instructions may be used to dynamically illuminate the plurality of light sources in a variety of predetermined or random patterns, which may be configured for producing custom or variable stylistic or decorative features including lighting effects having different colors (e.g., via control of differently colored LEDs) and animated lighting effects.

Figure 5:
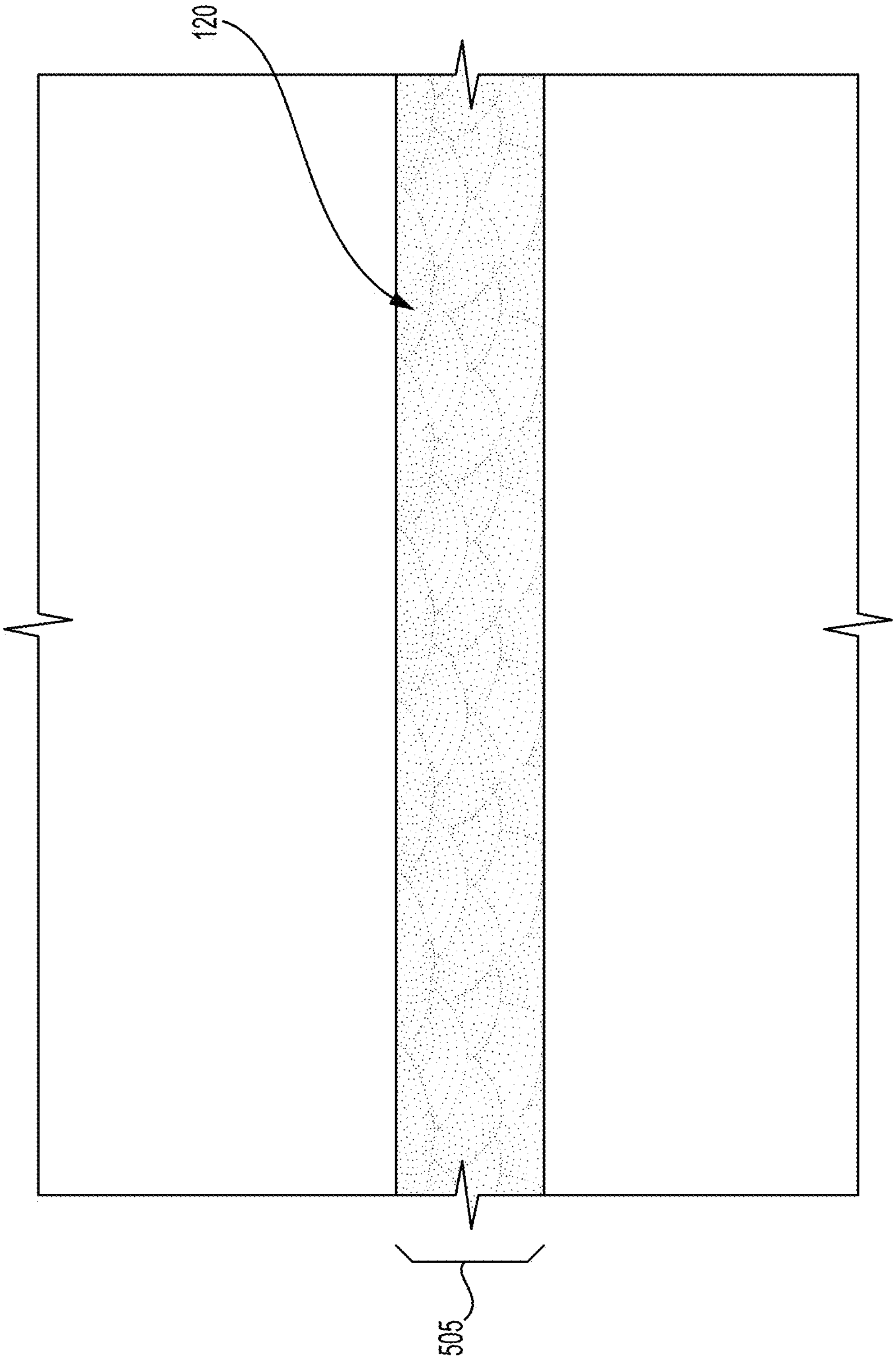
FIG. 5 shows an illustration of an illuminated light pipe exhibiting full width illumination.

FIG. 5 shows an illustration of an illuminated light pipe 120 exhibiting full width illumination. The illustration shown in FIG. 5 represents activating the array of light sources 205-*x* associated with the first clear diffusion sheet 110-1. The full width illumination is represented by element 505 and fills the diameter of the light pipe 120.

Figure 6:
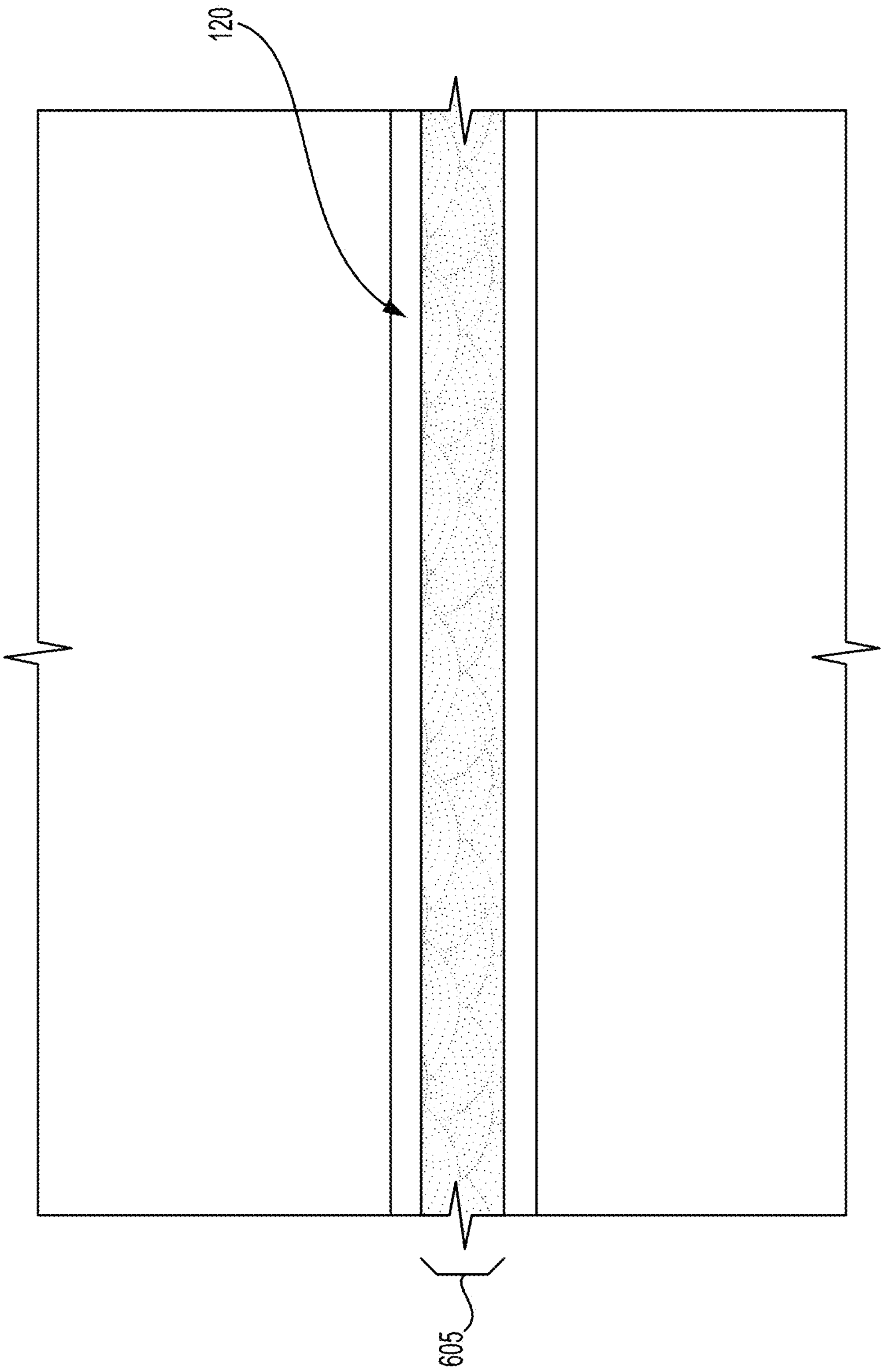
FIG. 6 shows an illustration of an illuminated light pipe exhibiting partial width illumination.

FIG. 6 shows an illustration of an illuminated light pipe 120 exhibiting partial width illumination. The illustration shown in FIG. 6 represents activating an array of light sources 205-*x* that is associated with a clear diffusion sheet that is farther from the mask (e.g., the array of light sources aligned with one of diffusion sheets 110-2, 110-3, or 110-4). The partial width illumination is represented by element 605 and fills only a portion of the diameter of the light pipe 120.

FIG. 7 shows a top view of mask 115 with slot 117. As described above, slot 117 is aligned longitudinally and spans nearly the entire length of mask 115.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A light pipe apparatus, comprising:

at least two clear diffusion sheets aligned adjacent each other, wherein each clear diffusion sheet comprises an edge and a façade;

at least two light sources, where each light source is configured to illuminate a respective one of the at least two clear diffusion sheets via the edge such that light is emitted from the façade;

a mask disposed adjacent a first sheet of the at least two clear diffusion sheets, wherein the mask comprises a slot aligned with a façade of the first sheet such that light emitted from the façade passes through the slot; and a light pipe aligned with the slot such that light passing through the slot illuminates at least a portion of the light pipe;

wherein the light pipe is an elongated optical member of a cylindrical or oval cross-sectional shape;

wherein the slot comprises a longitudinal shape configured to substantially align with the light pipe; and wherein the longitudinal shape of the slot comprises an opening through the mask that substantially spans a length of the at least two clear diffusion sheets and the light pipe.

2. The light pipe apparatus of claim 1, wherein each of the at least two light sources comprises an array of light emitting devices.

3. The light pipe apparatus of claim 2, wherein each array of light emitting devices is aligned with the edge of a corresponding clear diffusion sheet to provide edge lighting of the corresponding clear diffusion sheet.

4. The light pipe apparatus of claim 1, wherein the at least two clear diffusion sheets are disposed different distances from the mask such that a width of light projected through the slot depends on a distance between the mask and a respective clear diffusion sheet.

5. The light pipe apparatus of claim 4, wherein individual illumination of each of the at least two light sources enables alteration of the width of light projected through the slot thereby altering the portion of the light pipe that is illuminated.

6. A method of projecting light from a light pipe apparatus, the method comprising:

emitting light from at least two light sources, where each light source is configured to illuminate a respective one of at least two clear diffusion sheets via an edge of each clear diffusion sheet such that light is emitted from a façade of each clear diffusion sheet;

filtering light emitted from the at least two clear diffusion sheets via a mask disposed adjacent a first sheet of the at least two clear diffusion sheets, wherein the mask comprises a slot aligned with a façade of the first sheet such that lighted emitted from the façade passes through the slot; and projecting light from a light pipe being an elongated optical member of a cylindrical or oval cross-sectional shape and being aligned with the slot such that light passing through the slot illuminates at least a portion of the light pipe;

wherein filtering light via the mask comprises filtering light in a longitudinal shape via the slot such that filtered light substantially aligns with the light pipe; and wherein projecting light from the light pipe comprises projecting light having a longitudinal shape that substantially spans a length of the light pipe.

7. The method of claim 6, wherein emitting light from each of the at least two light sources comprises emitting light from an array of light emitting devices.

8. The method of claim 6, comprising individually emitting light from each of the at least two light sources, wherein the at least two clear diffusion sheets are disposed different distances from the mask such that an angle of light passing through the slot depends on a distance between the mask and a respective diffusion sheet.

9. The method of claim 6, comprising altering a width of the portion of the light pipe being illuminated by edge lighting of each of the at least two clear diffusion sheets individually, wherein the at least two clear diffusion sheets are disposed different distances from the mask.

10. The method of claim 6, comprising illuminating a full width of the light pipe by activating one of the light sources associated with the clear diffusion sheet nearest the mask.

* * * * *